United States Patent
Fitch et al.

(10) Patent No.: US 10,180,713 B2
(45) Date of Patent: *Jan. 15, 2019

(54) METHOD AND SYSTEM FOR UTILIZING PROXIMITY LIGHTING AND PLUG CONTROLS FOR REAL TIME LOCATION SENSING

(71) Applicant: BCP CONTROLS, LLC, Waco, TX (US)

(72) Inventors: John Edward Fitch, Woodway, TX (US); James M. Steward, Crawford, TX (US); John D. Holland, II, Waco, TX (US)

(73) Assignee: BCP CONTROLS, LLC, Waco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/134,235

(22) Filed: Apr. 20, 2016

(65) Prior Publication Data

US 2016/0370842 A1    Dec. 22, 2016

Related U.S. Application Data

(63) Continuation-in-part of application No. 14/011,565, filed on Aug. 27, 2013, now Pat. No. 9,342,125.

(60) Provisional application No. 61/694,113, filed on Aug. 28, 2012, provisional application No. 62/261,656, filed on Dec. 1, 2015.

(51) Int. Cl.
*G06F 1/26* (2006.01)
*G06F 1/32* (2006.01)
*G06F 1/28* (2006.01)
*G05B 19/042* (2006.01)

(52) U.S. Cl.
CPC ......... *G06F 1/3231* (2013.01); *G05B 19/042* (2013.01); *G06F 1/26* (2013.01); *G06F 1/28* (2013.01); *G06F 1/3203* (2013.01); *G06F 1/325* (2013.01); *G05B 2219/2639* (2013.01)

(58) Field of Classification Search
CPC .......... G06F 1/26; G06F 1/3203; G06F 1/325
USPC ............................... 713/300, 320, 323, 340
See application file for complete search history.

(56) References Cited

U.S. PATENT DOCUMENTS

| | | | |
|---|---|---|---|
| 9,342,125 B1 * | 5/2016 | Fitch | .......... G06F 1/26 |
| 2008/0270814 A1 | 10/2008 | Starr et al. | |
| 2010/0306559 A1 | 12/2010 | Ewing et al. | |
| 2013/0003572 A1 | 1/2013 | Kim et al. | |
| 2013/0091370 A1 | 4/2013 | Starr et al. | |

OTHER PUBLICATIONS

International Preliminary Report on Patentability dated Jun. 14, 2018, Received in corresponding International Application No. PCT/US2016/064397 (11 pages).

* cited by examiner

*Primary Examiner* — Michael J Brown
(74) *Attorney, Agent, or Firm* — David G. Henry, Sr.

(57) ABSTRACT

The invention pertains to a method and system which utilizes individual lighting fixtures and electrical plug controls to provide a rigorous and ubiquitous grid of sensors within or around a facility or facilities. The system utilizes a variety of parameters at the tag, lighting and plug controllers and central processor level to provide unique location and tracking information on objects, equipment, and personnel in the facility. The unique aspects of the system provide higher spatial and temporal accuracy and the ability to track high spatial densities of devices.

25 Claims, 10 Drawing Sheets

User Proximity and Power Sensing
and Control Device Block Diagram

Figure 1 – Overall System Block Diagram

Figure 2 – User Proximity and Power Sensing and Control Device Block Diagram

Figure 9 – Example of relative sensitivities for each CD fixture in room G155. Radius is equivalent to correction factors. Blue is stronger than average. White is weaker than average.

METHOD AND SYSTEM FOR UTILIZING PROXIMITY LIGHTING AND PLUG CONTROLS FOR REAL TIME LOCATION SENSING

CROSS-REFERENCE TO RELATED APPLICATIONS

This application is a continuation-in-part of, and claims priority to U.S. Nonprovisional application Ser. No. 14/011,565, entitled "Method and System for utilizing a device's user location to monitor and control the device power usage" and filed on Aug. 28, 2013, which claims priority to U.S. Provisional Application Ser. No. 61/694,113, entitled "Method and System for utilizing a device's user location to monitor and control the device power usage," filed Aug. 28, 2012. This application further claims priority to U.S. Provisional Application Ser. No. 62/261,656, entitled "Method and System for utilizing a device's user location to monitor and control the device power usage" and filed Dec. 1, 2015.

BACKGROUND OF THE INVENTION

The ability to accurately establish user or equipment location in a building or complex of buildings enables a variety of value added applications. A number of Real Time Location Service (RTLS) or similar systems exist based on various radio frequency (RF), Ultra Wide Band (UWB), Infrared (IR), Ultrasonic, or other systems. Typically these systems require the addition of infrastructure installations of various dedicated receivers or instrumentation both in the building and on the user and provides limited spatial and temporal accuracy for a limited number of devices.

In order to solve these limitations, the present invention provides a unique approach utilizing the above referenced lighting and plug load control patent installed in a ubiquitous grid of regularly spaced lighting and electrical plug locations for monitoring the location of personnel, equipment and objects within or around a facility or group of facilities. Additional characteristics of the present invention include ease of installation and automation of reporting or functions based on user requirements, providing for cost-effective use.

SUMMARY OF THE INVENTION

An object of the present invention is to provide a system for monitoring user or equipment location in or around a building or buildings based on the detection of their proximity to various light fixtures or electrical plugs located regularly and ubiquitously throughout or around a facility or group of facilities. Another object of the present invention is to provide continuous tracking of the user or equipment as it moves through a facility in proximity to the lighting and electrical plugs. Another object of the present invention is to provide controls to the system to allow flexibility in temporal and spatial resolution of the solution based on user established requirements. These objects of the invention enable various solutions that may not be achievable by other systems for tracking accuracy, tracking large numbers of items, tracking of a high spatial density of individual items, or for rapidly tracking individual devices.

To achieve these objectives, the present invention utilizes lighting and plug load controllers as described in patent application Ser. No. 14/011,565. That system consists of a proximity tag (PTAG) similar to an active RFID tag on the object, equipment, or person being located and tracked, and a series of lighting and plug controllers which sense the PTAG for proximity based lighting and plug control purposes. In addition there are software systems and algorithms which enable integration of individual light and plug proximity information. Each of the described components has unique functions that can be used to optimize a user's desired results for location and tracking of individual or groups of objects, equipment, or, personnel.

DETAILED DESCRIPTION

In the following description of the present invention there are multiple details established to provide a thorough understanding of the invention and the preferred implementations of the invention. It should be clear that the description is not intended to limit the invention to these specific embodiments and those variations, changes, substitutions, or equivalent components will be apparent to those skilled in the art and should not be considered significant differences from the intended scope of the invention.

Figure 1:
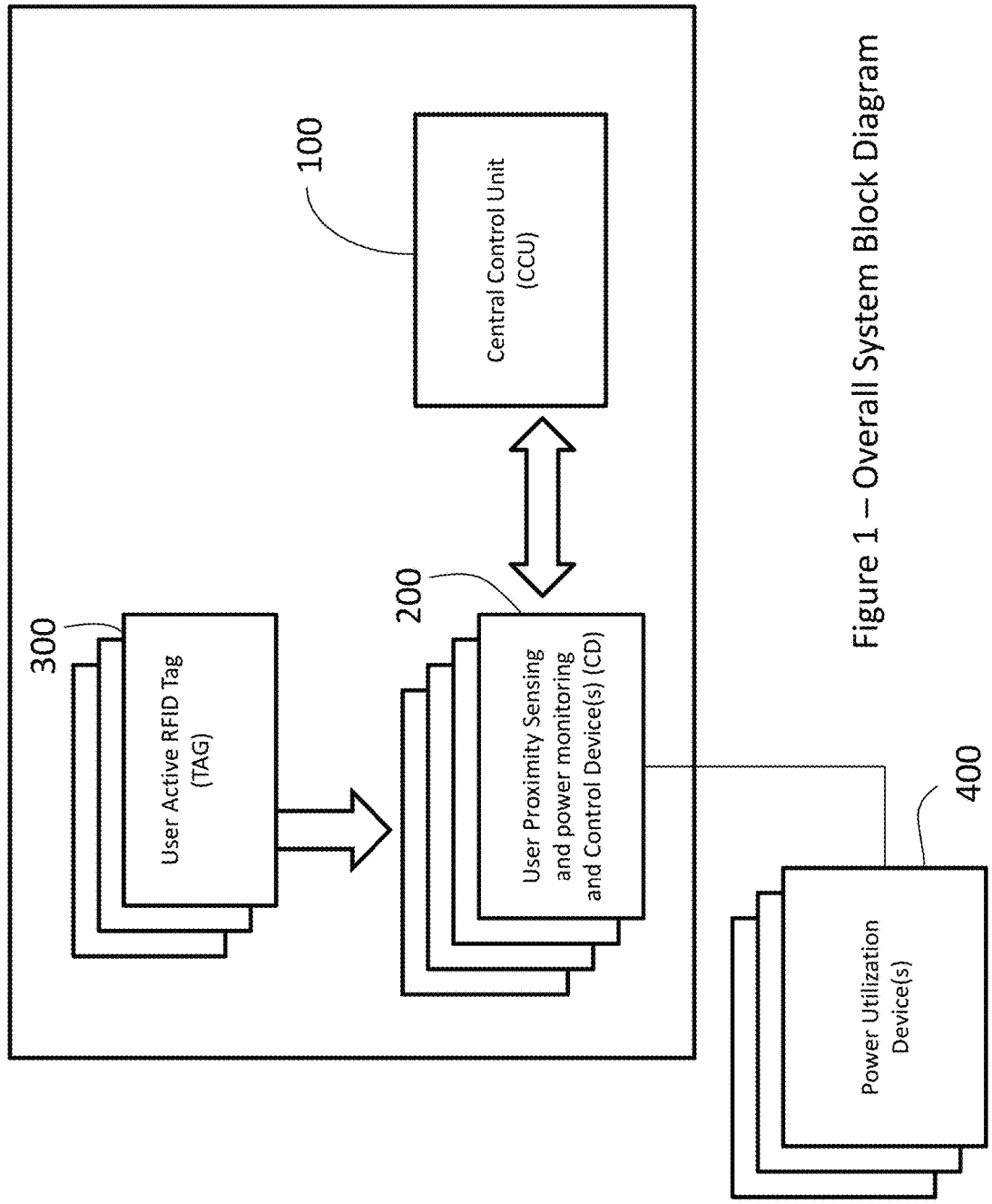
FIG. 1 is a system for monitoring proximity tags sensed through proximity energy monitoring and control devices, according to one or more embodiments.

The system as described in FIG. 1 intends to monitor a series of proximity tags sensed through proximity energy monitoring and control devices (CDs) attached to lighting fixtures and/or electrical plugs distributed ubiquitously and regularly in a grid like pattern throughout a facility. The system takes advantage of the natural grid like pattern formed from the typical layout of lighting fixtures, wall plugs, wall switches or other sensing devices distributed throughout and around a facility. The natural grid like pattern provides a rigid and mathematically regular distribution of sensing devices than provides a unique infrastructure for accurately sensing location information of proximity tags. The invention uses the information on proximity from this grid of CDs to aggregate an accurate and timely position for any number of objects, equipment, or users within or around a facility or facilities using the energy monitoring devices.

The current embodiment of the invention utilizes the devices and system as described in U.S. patent application Ser. No. 14/011,565 as the interface to individual devices and as a means of determining user, object, or equipment location. The CDs (200) described in FIG. 1 may be either plug control units, switch control units, sensor control units or individual lighting fixture control units spaced regularly and ubiquitously throughout or around a room, wing, floor, facility or group of facilities. Power utilization device(s) 400 may be electrically coupled to the control device(s) 200.

Figure 2:
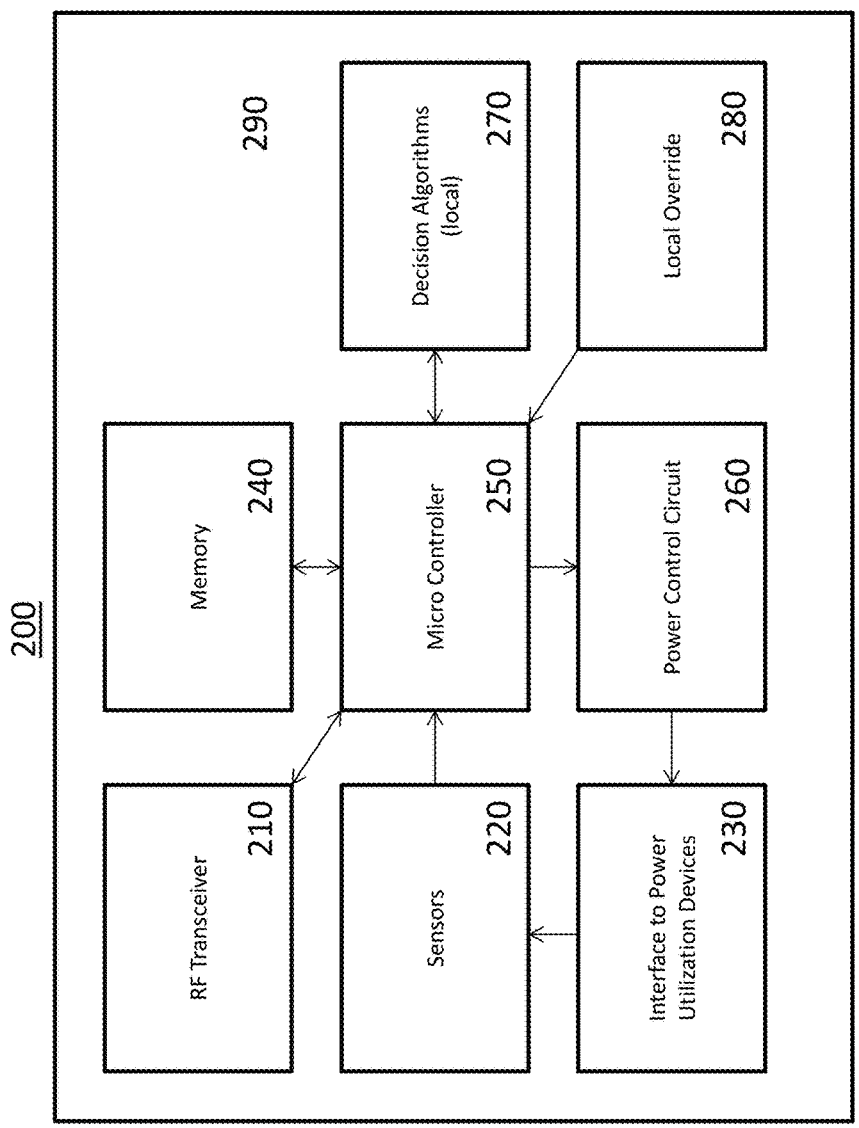
FIG. 2 depicts the individual logical and functional components of the Control Device, according to one or more embodiments.

FIG. 2 depicts the individual logical and functional components of the CD (200) to include an RF transceiver (210), various sensors (220), an interface to a power utilization device (230), logical memory (240), a microcontroller (250), decision algorithms (270), and a local override device (280).

The microcontroller (250) provides the ability to communicate through the RF transceiver (210) to the Tag and the CCU as well as the ability to interrogate the various sensors (220) and to use the decision algorithms (270) and memory (240) to properly interpret between individual tags or groups of tags and to filter or sort various tags based on relative proximity or user query. The current embodiment utilizes a System on a Chip (SOC) to encompass the functions of the RF transceiver (210), memory (240), and microcontroller (250). Furthermore the SOC provides the analog and digital interfaces to the sensors (220) and allows decision algorithms (270) to be stored in local memory (240). If required, the CD can be battery powered or connected to a power source.

The sensors (220) can be current sensors, power sensors, temperature sensors, motion sensors, radiation sensors, or other sensors. They can have either a digital or analog interface to the microcontroller (250). The sensors work through the interface to the power utilization device to accurately monitor the proximity of a given tag or group of tags relative to the position of the CD. In the current embodiment, the SOC antenna is the received signal strength indication (RSSI) sensor and the resolution of the RSSI is based on the SOC hardware and associated algorithm.

Figure 5:
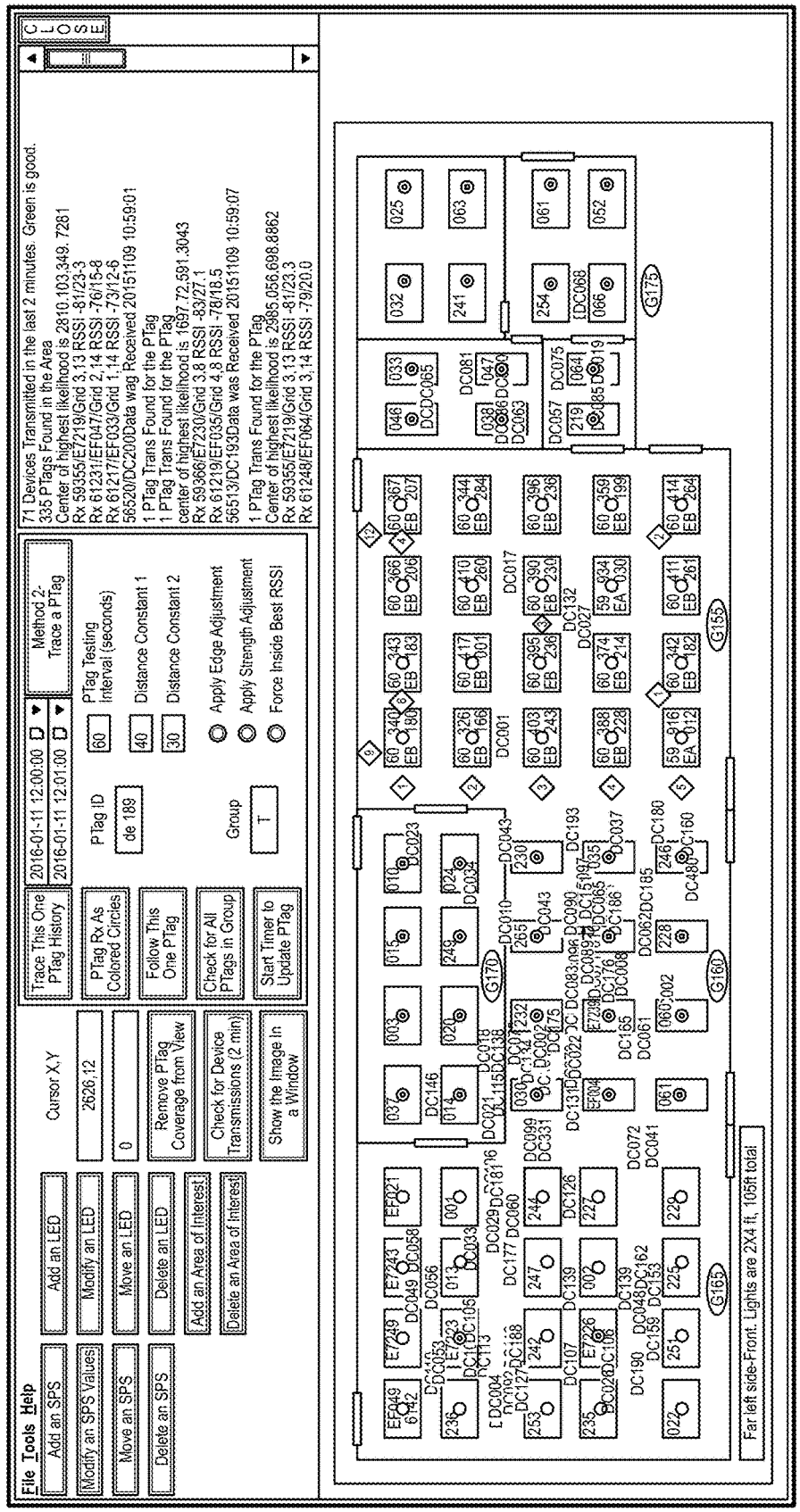
FIG. 5 depicts control devices detecting equipment and personal tags, according to one or more embodiments.

Depending on use case and application requirements for the position data of the equipment or user being tracked, a significant number of Tags may be present within the detection range of one or more CDs. This can create a significant issue with systems relative to detecting and tracking a single device within a large group of devices in close proximity to each other. In addition, because of individual Tag mounting on a piece of equipment or user being tracked, the signal strength from an individual tag may be significantly weaker than other Tags. A method for ensuring tags are tracked regardless of relative strength is necessary. Additionally, items being tracked may have significantly different temporal requirements for tracking. A fast moving piece of equipment may need to transmit its signal once per second or less to adequately capture its instantaneous position. A piece of equipment that is typically static may need to transmit its location infrequently when not in motion until motion is sensed. A method for ensuring static or slow moving objects are tracked in a field of fast moving objects is necessary. In the current embodiment a series of parameters and algorithms are employed at various stages of the system to allow the signal from a single device to be heard amongst multiple devices regardless of the use case. These parameters can be commanded remotely from the CCU or can be programmed to allow autonomous actions for multiple potential or changing scenarios. In this manner, several hundreds or even thousands of individual devices or users can be tracked in the space of a single room as shown in FIG. 5.

In the current embodiment, the CD acquires Tag data over the course of a periodic cycle which is definable thru commands from the CCU. The periodic cycle includes listening for Tags and holding tag data in CD memory for comparison against various algorithm parameters described below. At the end of the periodic cycle, the Tag data is transmitted in a blind asynchronous manner to the CCU for further aggregation of data from multiple CDs before being passed on to the position determination algorithm. In the current embodiment, the CD typically listens for a period of 1 to 100 seconds before transmitting the Tag data to the CD. The period is determined thru parameters command able by the CCU. In the current embodiment, the CD has a number of memory locations which can be used to hold a series of Tag data prior to acting on the data in various ways described below. The number of memory locations can be assigned by commands from the CCU and can be assigned as fixed locations for specific individual tags. In this way, an end user may ensure all data for a given tag is passed on regardless of proximity to a given CD relative to other Tag data. These specific individual tags can also be assigned by commands from the CCU to the CD.

In the current embodiment, the CD can also isolate and focus on specific tags or groups of tags by switching Receive center frequency thru commands from the CCU. Individual tags or groups of tags may be set to a variety of central transmit frequencies. In the current embodiment this change to the CD receive frequency can be accomplished by individual commands to a single central frequency or through initiation of a sweep of frequencies in a pre-determined pattern from the CD memory.

In the current embodiment, the CD can further filter tags within a single central frequency band by adjusting the acceptable Received Signal Strength Indication (RSSI) thru commands from the CCU. In this manner, information on Tags in close proximity to an individual CD are passed on to the filtering and position determination algorithms and Tags outside of a given distance range are not added into the algorithms for that particular CD.

In the current embodiment, the CD can also be commanded to listen for multiple cycles before repeating an individual Tag's information. In this way Tags that are programmed to transmit more often may not inadvertently filter out Tags that transmit less frequently. (Tag transmission rate is a parameter described below.) This function can be switched in the CD through a pattern to allow 'fast moving' Tags to be tracked more rapidly without removing the ability to monitor 'slow moving or static' tags on a periodic basis.

In the current embodiment, the CD can also sort tags by proximity in a given time window prior to sending information on a Tag's signal strength (individual or average), number of times heard and RSSI range to the CCU. This sorting is accomplished through an algorithm on the CD which is activated through commands from the CCU. For high numbers of tags this function can be set to switch between sorted data and unsorted data allowing Tags with weak transmit signals to be heard amongst Tags with relatively strong transmit signals. This variation in Tag strength may be due to Tag battery, Tag antenna strength or interference from the position of the Tag relative to the user or equipment being tracked. Because each tag's position information is based on its transmission strength from multiple CDs, sorting on multiple tag signal strength alone might preclude a weaker signal from ever being heard without this function. As an example, this might apply to a Tag mounted on the bottom of a piece of equipment in a room of Tags mounted on top of their associated equipment.

Like the CD, the individual Tag may be controlled through a series of commands from the CCU when the Tag is put into programming mode. For RTLS purposes, a tag may be programmed associated with its function and to optimize its battery life or location accuracy. In the current embodiment, a Tag's central Transmit frequency can be set within a defined transmission band. In this way each Tag may be isolated from other tags or may be added to a part of a group of tags being tracked for a specific function.

In the current embodiment, the Tag's time between transmissions may be set based on an expected function. For example, if a Tag is being used to track a human user, time between tag transmissions may be set at approximately every 1 second to allow real time position determination to be less than 5 feet based on the walking speed of a human. A mobile piece of furniture may have its time between tag transmissions set to once per minute or even longer and may transmit once every 5 seconds based on activation of a motion sensor on the tag.

In a given facility there may be thousands of Tags transmitting their data thru hundreds of CDs to the CCU. Depending on CD and Tag parameters, a given Tag transmission may be heard by any number of CD's. All Tags and CDs are transmitting asynchronously. The initial task of the CCU is to aggregate data for each Tag heard by multiple CD's in a given time period. Although not necessarily required for different use cases, in the current embodiment this time period is equal to or greater than the transmission period of the CDs which is equal to or greater than the transmission period of the Tag. In this manner, data from multiple locations can be assessed as being from a given Tag position. The CCU aggregation can also vary the number of individual CD data sets for a given Tag by sorting the individual CD data for a given tag by RSSI strength. In this manner, accuracy of the solution can be traded against efficiency of the algorithm. In the current embodiment, only the data from the six closest proximity CD's to an individual PTAG is passed by the CCU to the location algorithm.

Figure 3:
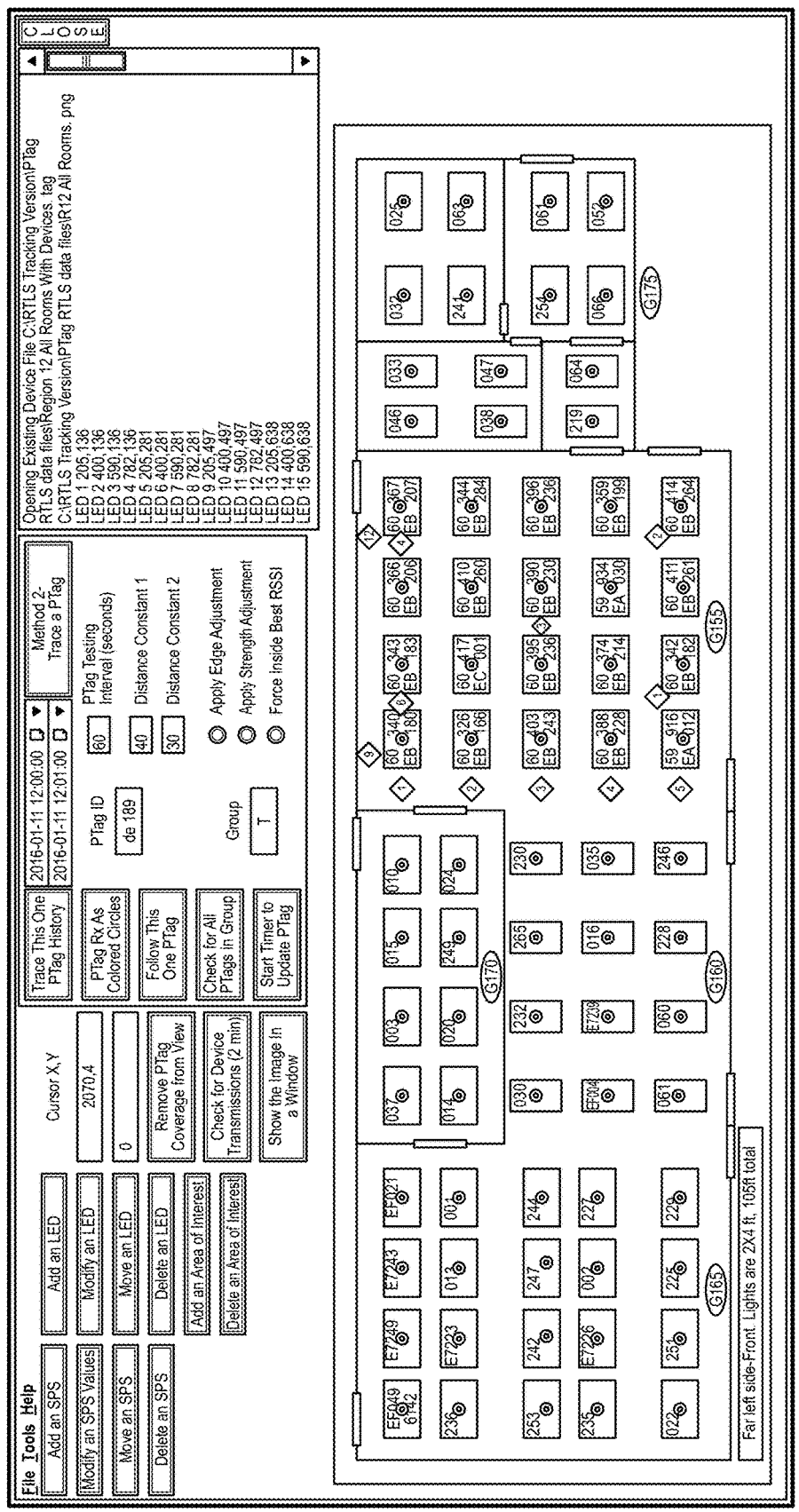
FIG. 3 depicts a plurality of control devices (CDs) arranged in a grid pattern in multiple areas, according to one or more embodiments.
Figure 4:
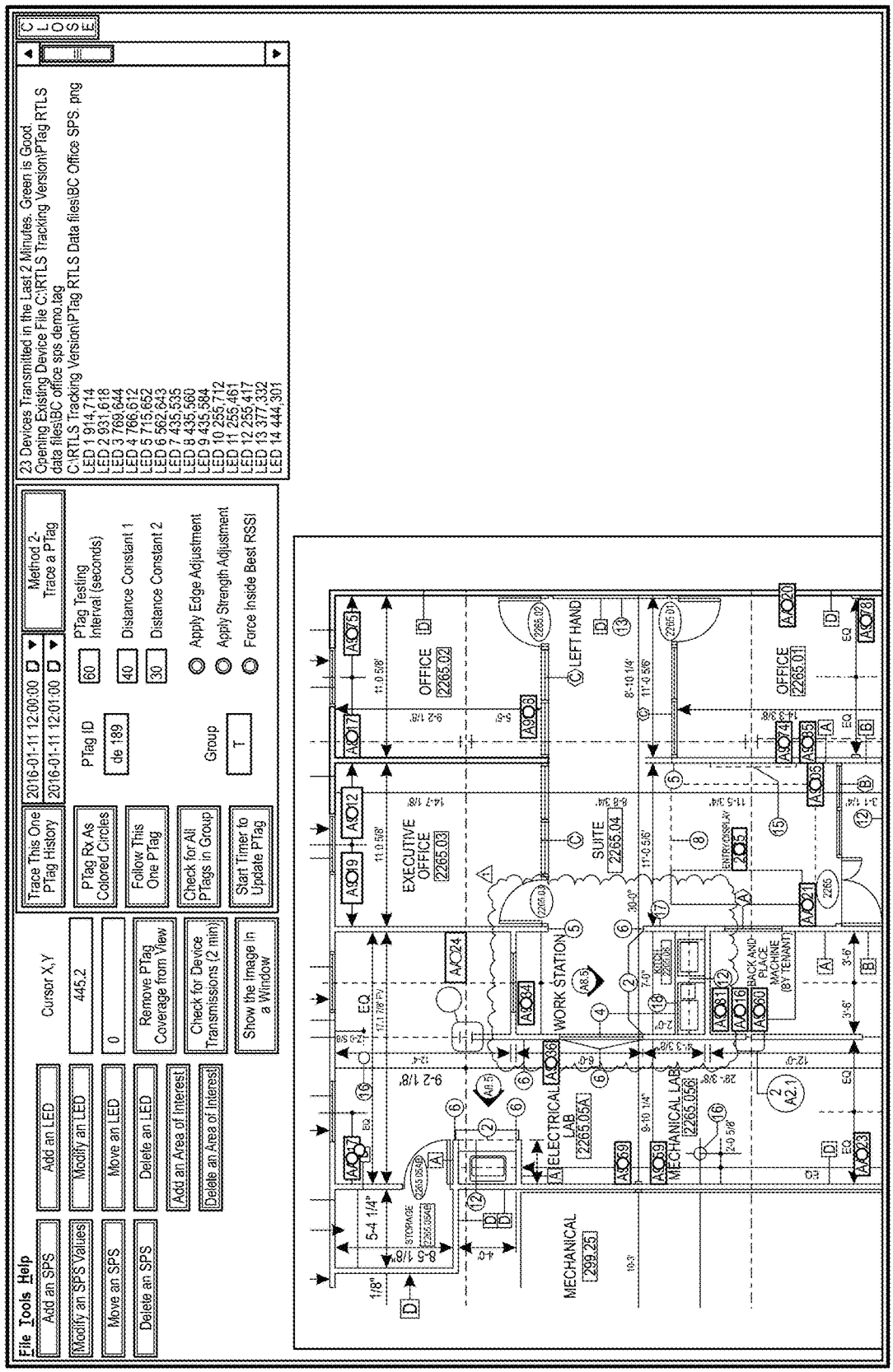
FIG. 4 depicts placement of plug locations and smart power strips acting as control devices, according to one or more embodiments.

FIG. 3 shows an example layout using lighting fixtures in an area of multiple rooms. Each of the lighting fixtures contains a lighting control unit (CD) which also acts as described above to listen for and calculate input data to the location algorithm. FIG. 4 shows another example using the placement of CD's associated with plug locations and smart power strips (SPS) accomplishing the CD function. Fix 5 shows the same area as FIG. 3 with the instantaneous location of approximately 100 pieces of equipment and personnel tags. The spatial information from FIG. 3 along with the CD ID information is a requirement for the location algorithm. Spatial information on the locations of the fixtures in the current embodiment as well as wall locations and room identification is provided from architectural and engineering drawings for the facility typically from the reflected ceiling drawings. Software is used to place the locations of the CDs from these drawings in order to provide for the graphical user interface output and for the location algorithm itself.

The location and tracking algorithm has multiple components including; radial distance calculation based on PTAG RSSI to a given CD, weighting factors based on number of times an individual CD heard a given PTAG within the various parameters described above, CD location relative to various perimeter effects for a given room/lighting/wall/ceiling/floor location, calibration effects for various CD to CD response for a given PTAG, calibration effects for various PTAG to PTAG variations, calibration effects for various PTAG orientation effects, calibration effects for equipment mounting effects, temporal variation of RSSI from CD to CD as compared with movement or orientation changes.

Figure 6:
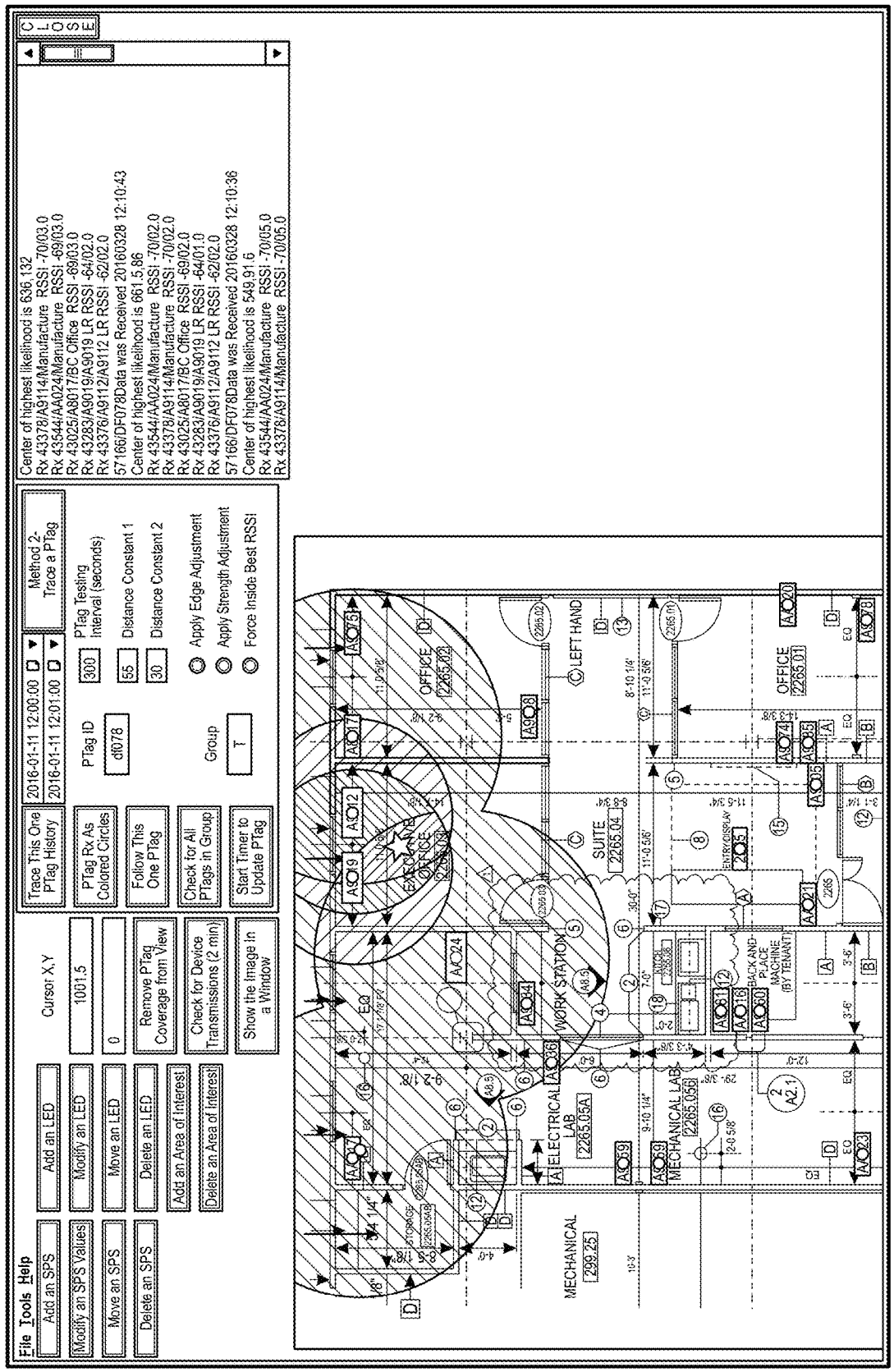
FIG. 6 illustrates a visualization of distance calculation from various control devices to a tag, according to one or more embodiments.

In the current embodiment, the computed radial distance from a CD to a given PTAG utilizes a well known equation; $d=A*(r/t)^B+C$ where d is radial distance, r is the rssi, t is a factor based on free space or building frequency attenuation factors, A, B, and C are constants based on a given systems parameters. Other similar methods are available in a variety of literature. An example of this distance calculation is shown in FIG. 6 where the circles are centered on the CD location and the circle radius is determined by the equations shown above. This example shows 5 CD circles with the purple area showing overlap from 4 of the 5 CDs depicting the highest probable location of the tag being tracked. Note that parameters in this example were chosen to depict the equations being used not necessarily to depict an optimized solution for this tag.

In the current embodiment, depending upon PTAG, CD, CCU and algorithm parameters, multiple unique readings from one PTAG/CD pair may be provided each time the algorithm operates. CD level filtering and sorting of PTAG data as described above may therefore yield a higher number of unique data transmissions from one CD/PTAG pair versus another CD/PTAG pair. This weighting is purposeful as described above. In the current embodiment, the position and tracking algorithm utilizes this purposeful information by weighting the solution based on relative numbers of unique CD/PTAG pair rssi information, average rssi information, and variance information during a given time period. As an example, if an objects location is desired to be tracked every 60 seconds and the PTAG transmits every 5 seconds, the CD transmits its aggregated data every 5 seconds and the CCU aggregates data from multiple CD's every 5 seconds and assuming that there is a large density of unique PTAGs and that the CD's are configured for sorting by strongest signal. In this example, if the desired PTAG is detectable by 20 CD's at varying distances, then the CD's closest to the PTAG will likely transmit 12 unique readings for the PTAG each minute. As distance from the PTAG to a CD becomes larger, the percentage of transmissions of the farther PTAG will diminish for that CD. The CCU will see this as a numerically less number of transmissions from a given CD/PTAG pair and will pass the transmission number times the average RSSI to the location and tracking algorithm from the various CD/PTAG pairs. In this example the closer CDs to a given PTAG will therefore have a stronger function in the location and tracking algorithm.

Figure 7:
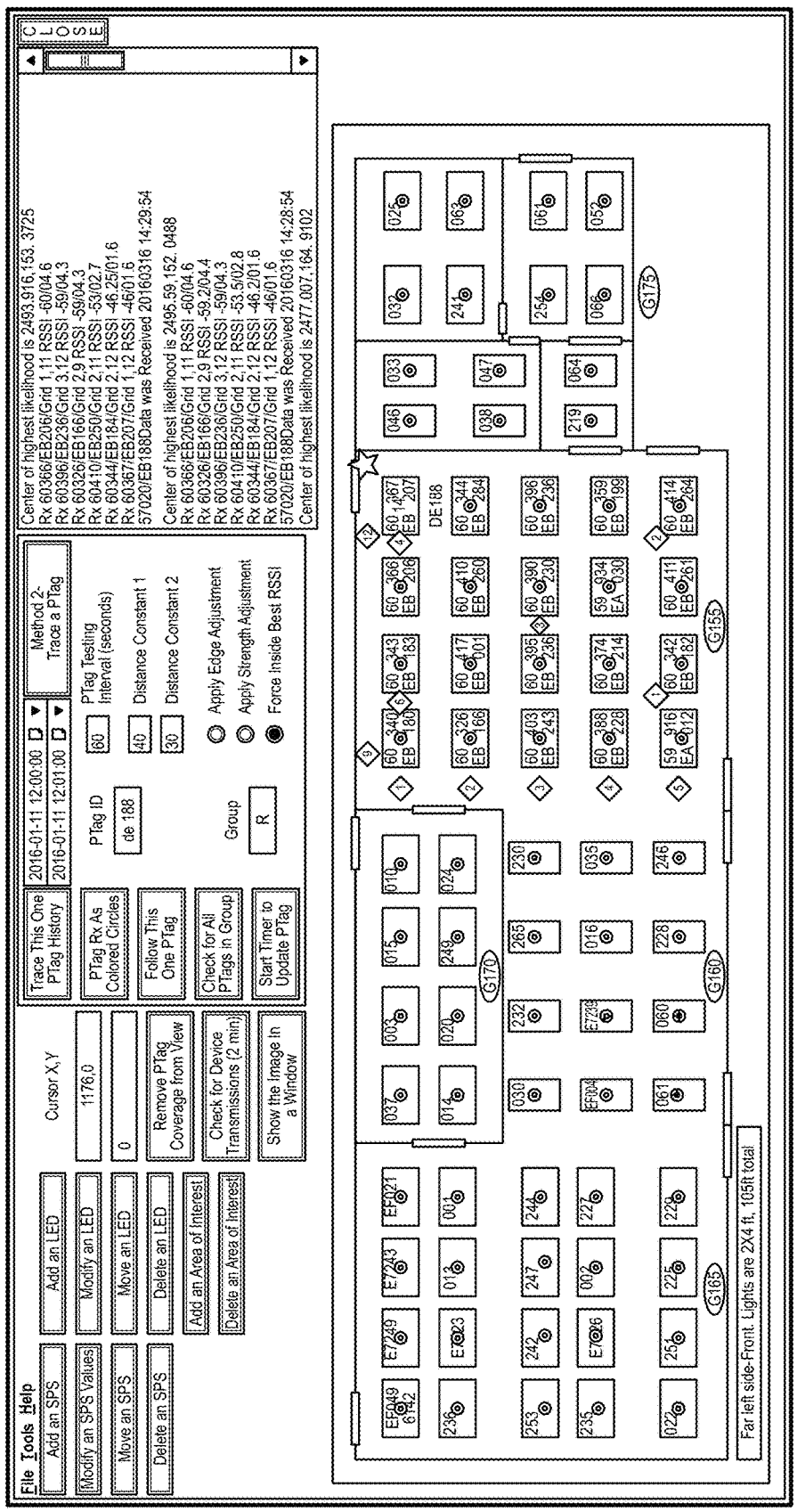
FIG. 7 illustrates location determination without employing an edge effect algorithm, according to one or more embodiments.
Figure 8:
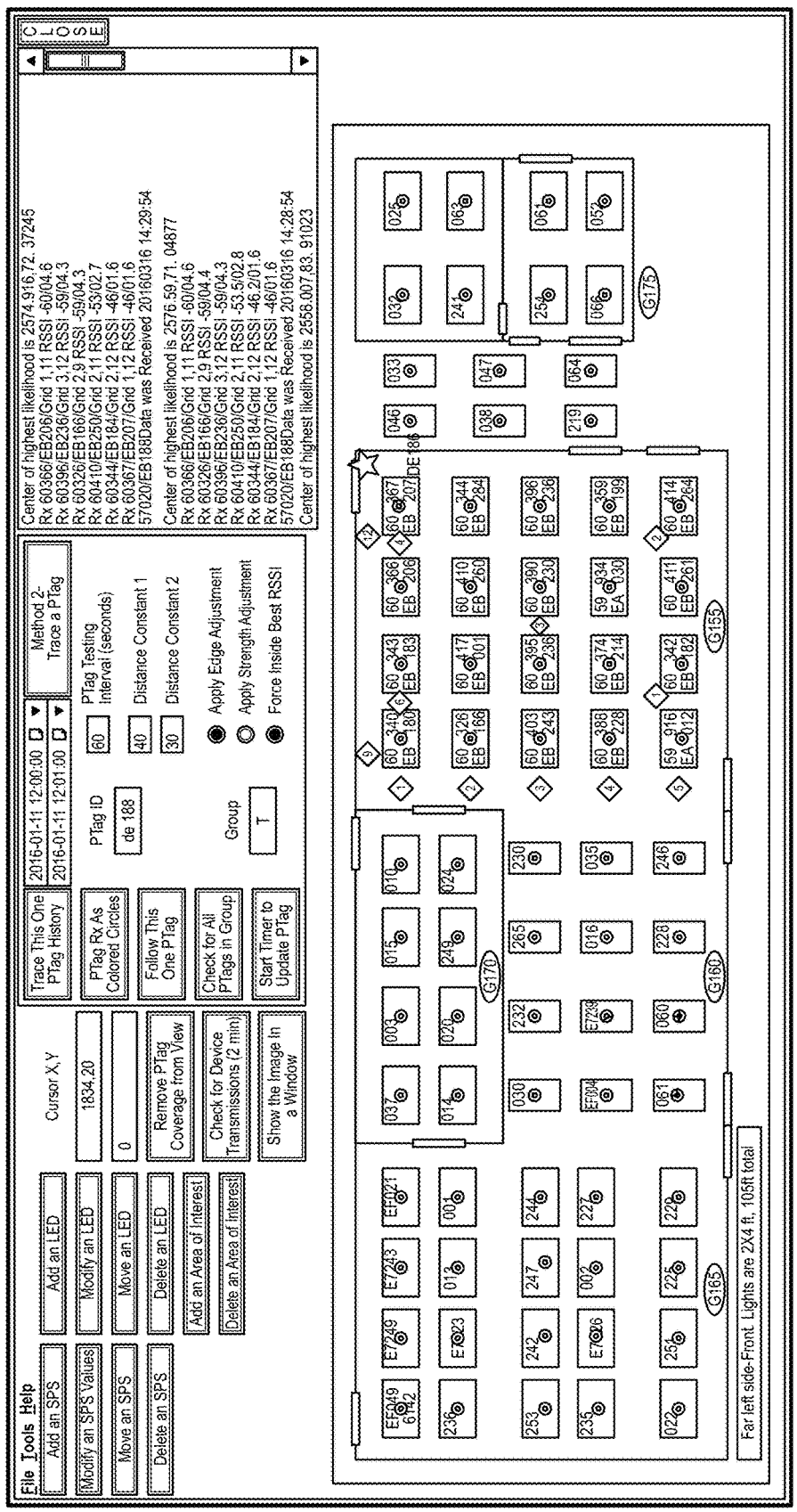
FIG. 8 illustrates location determination with an edge effect algorithm employed, according to one or more embodiments.

In the current embodiment, perimeter effects are taken into account by weighting the location of a given CD outward for a given room. As an example, FIG. 7 depicts a room labeled G155 where there are 20 CDs spaced at nearly equal distance in a 5 by 4 fixture pattern. For a PTAG in the center of the room, the contribution from the 4 CDs closest to the PTAG will provide equal weighting to show the location of the PTAG centered between the fixtures. If however a PTAG is in one of the corners of the room, only CD's towards the center of the room contribute to the location solution thereby creating a false position of the device. Because there are no CD's outside the room, the CD's on the perimeter of the room are given greater spatial weight by effectively moving their mathematical location outside of the room thereby pulling the PTAG location back towards the corner. The specific mathematical equation for these parameter adjustments is based on the number of CD's, the relative location of the CD's, interior and exterior wall locations and material construction of the room or rooms in question. FIG. 7 shows the calculated location for a Ptag in the corner of the room over 30 minutes with output once per minute without edge effects present. FIG. 8 shows exactly the same data but this time with edge effects turned on in the algorithm. For this case the relative error is reduced from approximately 4 feet to approximately 1 foot.

Figure 9:
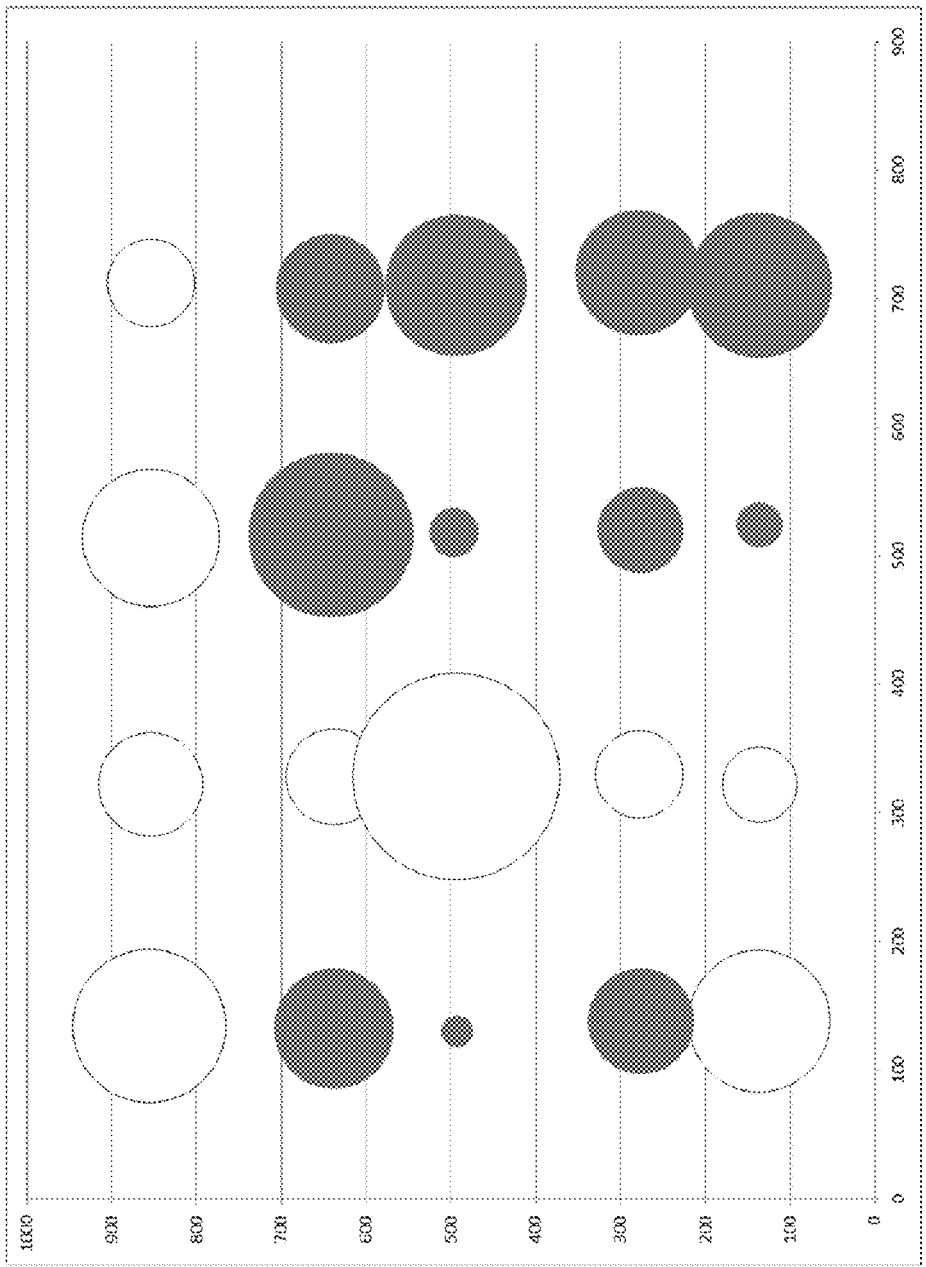
FIG. 9 depicts relative sensitivity for each control device fixture in a room, according to one or more embodiments.

In the current embodiment a relative strength calculation is applied such that the distance algorithm discussed above is applied equally to each CD regardless of their relative RSSI values for a given equidistant tag. This can be accomplished in a variety of ways including a self-calibration method. In the self-calibration method, each CD is set thru commanding by the CCU to act as a tag such that each CD records each other CD relative strength. With distance being know between each pair of CD's, an aggregate calibration factor can be established for each CD to optimize the radial distance algorithm and reduce the absolute error of the system. FIG. 9 depicts the relative sensitivities of the 20 CD's shown in room G155 from FIG. 7. In this depiction the radius for each CD corresponds to the correction that is applied to flatten the response function across a given area.

Another feature of the current system is the ability to locate CDs relative to one another when provide a grid of possible locations as supplied by a drawing depicting plug or fixture locations in a building. This is accomplished by using the same data from the self-calibration function described above. To accomplish this self-locating function, once the various fixtures are installed in a facility and a scale drawing of light fixture centers and plug locations is provided, the self-calibration system is initiated to generate a data set of relative distances between devices. An algorithm uses this data set to establish 'nearest neighbors' and assign a 'most probable' location of each device from the set of available locations. The CCU can then be used to generate a sequence of commands to the individual CD's providing a visual sequence that a user can use to validate the CD's location from the self-locating function. Once the device locations are validated, the previously acquired self-calibration data is run thru the calibration algorithm and fixture to fixture sensitivity adjustments are determined as described above.

Figure 10:
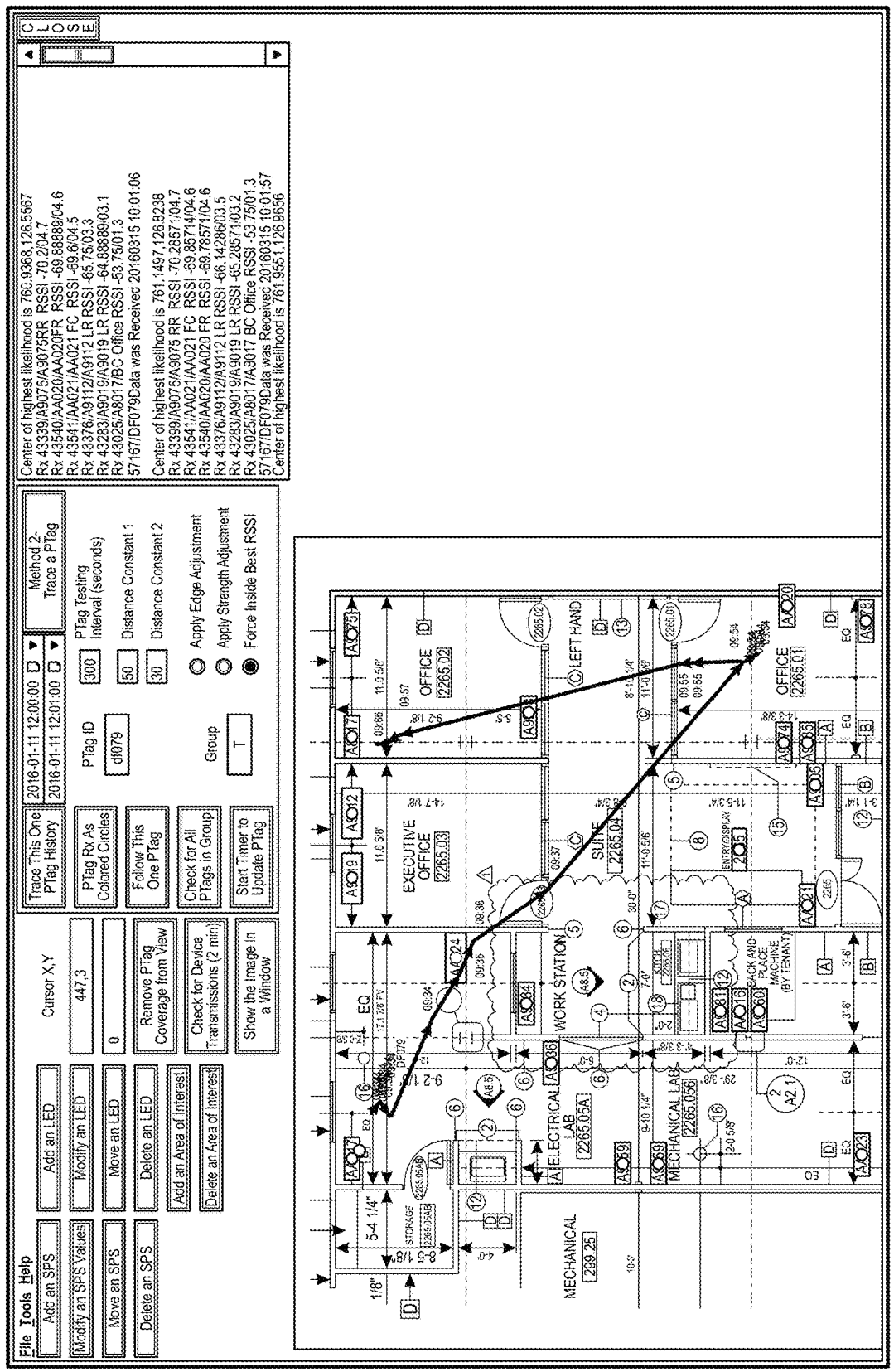
FIG. 10 depicts an example of location tracking as a function of time for a single tag, according to one or more embodiments.

Once the location and tracking algorithm completes a requested cycle, in the current embodiment, the X,Y,Z location relative to a facility coordinate system at a given absolute time is stored in an SQL database for use by the graphical user interface or other computational software. In the current embodiment, the graphical user interface software can display one or multiple device locations, can provide near real-time tracking of equipment and personnel as it travels through a facility, can provide historical locations or tracking of equipment and personnel and can provide reports on locations as a function of time such as length of time an individual is in a given room or portion of a room. Multiple other functions are also available. FIG. 9 shows and example of the system tracking a tag through a facility. In this case what is shown is the absolute location as a function of time. Adjustment of the multiple parameters described above would allow for higher resolution of actual path if so desired. FIG. 10 is an example of location tracking as a function of time for a single tag.

The invention claimed is:

1. A system for detecting and generating data reflecting locations of a plurality of subjects comprising:

a first power controller module, said first power controller module including first power input means for receiving a first flow of power, first power output means for directing said first flow of power away from said first power controller module, and intervening, operably connected, integral first power switching means for controlling the amount of power in said first flow of power;

said first power switching means being configured for actuation by an integral first power management module operably connected with said first power switching means, said first power management module including integral first actuation signal detection and actuation means configured for, in accordance with first commands and operational parameters, upon detection of a first actuating signal, actuating said first power switching means to alter first power output through said first power output means from a first initial power output level to a first altered power output level;

said first power controller module having integral, operably integrated first memory means for storing said first commands and operational parameters for effecting said altering of said first power output through said first power output means, said first memory means being operably connected with said first actuation signal detection and actuation means;

wherein said first actuation signal detection and actuation means is configured for actuation by a first actuation signal from a first RF device, said first actuation signal including a first identification component for identifying said first actuation signal; wherein said first actuation signal detection and actuation means is configured for, upon detecting signals that are other than said first actuation signal, reacting other than in response to said first actuation signal; and said first power management module being further configured for receiving, through network communications interface means, said first commands and operational parameters from a remote management system for programing first power management module.

2. The system of claim 1 wherein said first commands and operational parameters further include functionality for recording in said first memory means and reporting to said remote management system the signal strength of said first actuating signal.

3. The system of claim 1 wherein:

said first actuation signal detection and actuation means is further configured for actuation by a second actuation signal from a second RF device, said second actuation signal including a second identification component for identifying said second actuation signal; and wherein said first actuation signal detection and actuation means is configured for, upon detecting signals that are other than said second actuation signal, reacting other than in response to said second actuation signal.

4. The system of claim 1 further comprising:

a second power controller module, said second power controller module including second power input means for receiving a second flow of power, second power output means for directing said second flow of power away from said second power controller module, and intervening, operably connected, integral second power switching means for controlling the amount of power in said second flow of power;

said second power switching means being configured for actuation by an integral second power management module operably connected with said second power switching means, said second power management module including integral second actuation signal detection and actuation means configured for, in accordance with second commands and operational parameters, upon detection of a second actuating signal, actuating said second power switching means to alter second power output through said second power output means from a second initial power output level to a second altered power output level;

said second power controller module having integral, operably integrated second memory means for storing said second commands and operational parameters for effecting said altering of said second power output through said second power output means, said second memory means being operably connected with said second actuation signal detection and actuation means;

wherein said second actuation signal detection and actuation means is configured for actuation by said first actuation signal from said first RF device;

wherein said second actuation signal detection and actuation means is configured for, upon detecting signals that are other than said first actuation signal, reacting other than in response to said first actuation signal;

said second power management module being further configured for receiving, through second network communications interface means, said second commands and operational parameters from said remote management system for programming said second power management module;

wherein said second commands and operational parameters further include functionality for recording in said second memory means and reporting to said remote management system the signal strength of said second actuating signal; and wherein said remote management system is configured with program logic for estimating and reporting a location of said first RF device based, at least in part, on the signal strength of said first actuation signal.

5. The system of claim 4 further comprising:

a third power controller module, said third power controller module including third power input means for receiving a third flow of power, third power output means for directing said third flow of power away from said third power controller module, and intervening, operably connected, integral third power switching means for controlling the amount of power in said third flow of power;

said third power switching means being configured for actuation by an integral third power management module operably connected with said third power switching means, said third power management module including integral third actuation signal detection and actuation means configured for, in accordance with third commands and operational parameters, upon detection of a third actuating signal, actuating said third power switching means to alter third power output through said third power output means from a third initial power output level to a third altered power output level;

said third power controller module having integral, operably integrated third memory means for storing said third commands and operational parameters for effecting said altering of said third power output through said third power output means, said third memory means being operably connected with said third actuation signal detection and actuation means;

wherein said third actuation signal detection and actuation means is configured for actuation by said first actuation signal from said first RF device;

wherein said third actuation signal detection and actuation means is configured for, upon detecting signals that are other than said first actuation signal, reacting other than in response to said first actuation signal;

said third power management module being further configured for receiving, through third network communications interface means, said third commands and operational parameters from said remote management system for programing said third power management module; and wherein said third commands and operational parameters further include functionality for recording in said third memory means and reporting to said remote management system the signal strength of said third actuating signal.

6. The system of claim 5 wherein:

said third actuation signal detection and actuation means is further configured for actuation by a second actuation signal from a second RF device, said second actuation signal including a second identification component for identifying said second actuation signal; and wherein said third actuation signal detection and actuation means is configured for, upon detecting signals that are other than said second actuation signal, reacting other than in response to said second actuation signal.

7. The system of claim 5 wherein:

said second actuation signal detection and actuation means is further configured for actuation by a second actuation signal from a second RF device, said second actuation signal including a second identification component for identifying said second actuation signal;

wherein said second actuation signal detection and actuation means is configured for, upon detecting signals that are other than said second actuation signal, reacting other than in response to said second actuation signal;

said third actuation signal detection and actuation means is further configured for actuation by said second actuation signal from said second RF device, said second actuation signal including a second identification component for identifying said second actuation signal; and wherein said third actuation signal detection and actuation means is configured for, upon detecting signals that are other than said second actuation signal, reacting other than in response to said second actuation signal.

8. The system of claim 7 further comprising:

said first RF device that is a first active RFID transmitter, said first active RFID transmitter being configured for substantially, continuously repetitive transmitting of said first actuation signal;

wherein said first active RFID transmitter is configured for transmitting of said first actuation signal including said first identification component for identifying said first actuation signal;

said second RF device that is a second active RFID transmitter, said second active RFID transmitter being configured for substantially, continuously repetitive transmitting of said second actuation signal; and wherein said second active RFID transmitter is configured for transmitting of said second actuation signal including said second identification component for identifying said second actuation signal.

9. The system of claim 5 further comprising:
said first RF device that is a first active RFID transmitter, said first active RFID transmitter being configured for substantially, continuously repetitive transmitting of said first actuation signal; and
wherein said first active RFID transmitter is configured for transmitting of said first actuation signal including said first identification component for identifying said first actuation signal.

10. The system of claim 4 wherein:
said second actuation signal detection and actuation means is further configured for actuation by a second actuation signal from a second RF device, said second actuation signal including a second identification component for identifying said second actuation signal;
wherein said second actuation signal detection and actuation means is configured for, upon detecting signals that are other than said second actuation signal, reacting other than in response to said second actuation signal.

11. The system of claim 10 further comprising:
said first RF device that is a first active RFID transmitter, said first active RFID transmitter being configured for substantially, continuously repetitive transmitting of said first actuation signal;
wherein said first active RFID transmitter is configured for transmitting of said first actuation signal including said first identification component for identifying said first actuation signal;
said second RF device that is a second active RFID transmitter, said second active RFID transmitter being configured for substantially, continuously repetitive transmitting of said second actuation signal; and
wherein said second active RFID transmitter is configured for transmitting of said second actuation signal including said second identification component for identifying said second actuation signal.

12. The system of claim 4 further comprising:
said first RF device that is a first active RFID transmitter, said first active RFID transmitter being configured for substantially, continuously repetitive transmitting of said first actuation signal;
wherein said first active RFID transmitter is configured for transmitting of said first actuation signal including said first identification component for identifying said first actuation signal.

13. The system of claim 1 further comprising:
said first RF device that is a first active RFID transmitter, said first active RFID transmitter being configured for substantially, continuously repetitive transmitting of said first actuation signal; and
wherein said first active RFID transmitter is configured for transmitting of said first actuation signal including said first identification component for identifying said first actuation signal.

14. A method for detecting and generating data reflecting locations of a plurality of subjects comprising the steps of:
selecting and placing in a substantially stationary position a proximity monitoring device;
selecting a remote management system that is configured for wireless communication with said proximity monitoring device, whereby said remote management system and said proximity monitoring device exchange data;
said proximity monitoring device comprising:
a first power controller module, said first power controller module including first power input means for receiving a first flow of power, first power output means for directing said first flow of power away from said first power controller module, and intervening, operably connected, integral first power switching means for controlling the amount of power in said first flow of power;
said first power switching means being configured for actuation by an integral first power management module operably connected with said first power switching means, said first power management module including integral first actuation signal detection and actuation means configured for, in accordance with first commands and operational parameters, upon detection of a first actuating signal, actuating said first power switching means to alter first power output through said first power output means from a first initial power output level to a first altered power output level;
said first power controller module having integral, operably integrated first memory means for storing said first commands and operational parameters for effecting said altering of said first power output through said first power output means, said first memory means being operably connected with said first actuation signal detection and actuation means;
wherein said first actuation signal detection and actuation means is configured for actuation by a first actuation signal from a first RF device, said first actuation signal including a first identification component for identifying said first actuation signal;
wherein said first actuation signal detection and actuation means is configured for, upon detecting signals that are other than said first actuation signal, reacting other than in response to said first actuation signal; and
said first power management module being further configured for receiving, through network communications interface means, said first commands and operational parameters from a remote management system for programming said first power management module;
actuating said proximity monitoring device; and
actuating said remote management system.

15. The method of claim 14 wherein said first commands and operational parameters further include functionality for recording in said first memory means and reporting to said remote management system the signal strength of said first actuating signal.

16. The method of claim 14 wherein:
said first actuation signal detection and actuation means is further configured for actuation by a second actuation signal from a second RF device, said second actuation signal including a second identification component for identifying said second actuation signal; and
wherein said first actuation signal detection and actuation means is configured for, upon detecting signals that are other than said second actuation signal, reacting other than in response to said second actuation signal.

17. The method of claim 14 further comprising the steps of selecting and actuating:
a second power controller module, said second power controller module including second power input means for receiving a second flow of power, second power output means for directing said second flow of power away from said second power controller module, and intervening, operably connected, integral second power switching means for controlling the amount of power in said second flow of power;

said second integral power switching means being configured for actuation by an integral second power management module operably connected with said second power switching means, said second power management module including integral second actuation signal detection and actuation means configured for, in accordance with second commands and operational parameters, upon detection of a second actuating signal, actuating said second power switching means to alter second power output through said second initial power output means from a second power output level to a second altered power output level;

said second power controller module having integral, operably integrated second memory means for storing said second commands and operational parameters for effecting said altering of said second power output through said second power output means, said second memory means being operably connected with said second actuation signal detection and actuation means;

wherein said second actuation signal detection and actuation means is configured for actuation by said first actuation signal from said first RF device;

wherein said second actuation signal detection and actuation means is configured for, upon detecting signals that are other than said first actuation signal, reacting other than in response to said first actuation signal; and said second power management module being further configured for receiving, through second network communications interface means, said second commands and operational parameters from said remote management system for programing said second power management module;

wherein said second commands and operational parameters further include functionality for recording in said second memory means and reporting to said remote management system the signal strength of said second actuating signal; and wherein said remote management system is configured with program logic for estimating and reporting a location of said first RF device based, at least in part, on the signal strength of said first actuation signal.

18. The method of claim 17 further comprising the steps of selecting and actuating:

a third power controller module, said third power controller module including third power input means for receiving a third flow of power, third power output means for directing said third flow of power away from said third power controller module, and intervening, operably connected, integral third power switching means for controlling the amount of power in said third flow of power;

said third power switching means being configured for actuation by an integral third power management module operably connected with said third power switching means, said third power management module including integral third actuation signal detection and actuation means configured for, in accordance with third commands and operational parameters, upon detection of a third actuating signal, actuating said third power switching means to alter third power output through said third power output means from a third initial power output level to a third altered power output level;

said third power controller module having integral, operably integrated third memory means for storing said third commands and operational parameters for effecting said altering of said third power output through said third power output means, said third memory means being operably connected with said third actuation signal detection and actuation means;

wherein said third actuation signal detection and actuation means is configured for actuation by said first actuation signal from said first RF device;

wherein said third actuation signal detection and actuation means is configured for, upon detecting signals that are other than said first actuation signal, reacting other than in response to said first actuation signal;

said third power management module being further configured for receiving, through third network communications interface means, said third commands and operational parameters from said remote management system for programing said third power management module; and wherein said third commands and operational parameters further include functionality for recording in said third memory means and reporting to said remote management system the signal strength of said third actuating signal.

19. The method of claim 18 wherein:

said third actuation signal detection and actuation means is further configured for actuation by a second actuation signal from a second RF device, said second actuation signal including a second identification component for identifying said second actuation signal; and wherein said third actuation signal detection and actuation means is configured for, upon detecting signals that are other than said second actuation signal, reacting other than in response to said second actuation signal.

20. The method of claim 19 wherein:

said first RF device that is a first active RFID transmitter, said first active RFID transmitter being configured for substantially, continuously repetitive transmitting of said first actuation signal;

wherein said first active RFID transmitter is configured for transmitting of said first actuation signal including said first identification component for identifying said first actuation signal;

said second RF device that is a second active RFID transmitter, said second active RFID transmitter being configured for substantially, continuously repetitive transmitting of said second actuation signal; and wherein said second active RFID transmitter is configured for transmitting of said second actuation signal including said second identification component for identifying said second actuation signal.

21. The method of claim 18 wherein:

said first RF device that is a first active RFID transmitter, said first active RFID transmitter being configured for substantially, continuously repetitive transmitting of said first actuation signal; and wherein said first active RFID transmitter is configured for transmitting of said first actuation signal including said first identification component for identifying said first actuation signal.

22. The method of claim 17 wherein:

said second actuation signal detection and actuation means is further configured for actuation by a second actuation signal from a second RF device, said second actuation signal including a second identification component for identifying said second actuation signal; and wherein said second actuation signal detection and actuation means is configured for, upon detecting signals that are other than said second actuation signal, reacting other than in response to said second actuation signal.

23. The method of claim 22 wherein:
said first RF device that is a first active RFID transmitter, said first active RFID transmitter being configured for substantially, continuously repetitive transmitting of said first actuation signal; and
wherein said first active RFID transmitter is configured for transmitting of said first actuation signal including said first identification component for identifying said first actuation signal.

24. The method of claim 18 wherein:
said second actuation signal detection and actuation means is further configured for actuation by a second actuation signal from a second RF device, said second actuation signal including a second identification component for identifying said second actuation signal;
wherein said second actuation signal detection and actuation means is configured for, upon detecting signals that are other than said second actuation signal, reacting other than in response to said second actuation signal;
said third actuation signal detection and actuation means is further configured for actuation by said second actuation signal from said second RF device, said second actuation signal including a second identification component for identifying said second actuation signal; and
wherein said third actuation signal detection and actuation means is configured for, upon detecting signals that are other than said second actuation signal, reacting other than in response to said second actuation signal.

25. The method of claim 14 further wherein said first RF device is a first active RFID transmitter, said first active RFID transmitter being configured for substantially, continuously repetitive transmitting of said first actuation signal; and wherein said first active RFID transmitter is configured for transmitting of said first actuation signal including said first identification component for identifying said first actuation signal.

* * * * *